G. S. Manning.
Excavator
Nº 29,182.        Patented Jul. 17, 1860.

Witnesses
Edw. F. Brown
Daniel Breed

Inventor
Gilbert S. Manning

UNITED STATES PATENT OFFICE.

GILBERT S. MANNING, OF SPRINGFIELD, ILLINOIS.

EXCAVATING-MACHINE.

Specification of Letters Patent No. 29,182, dated July 17, 1860.

*To all whom it may concern:*

Be it known that I, GILBERT S. MANNING, of Springfield, in the county of Sangamon and State of Illinois, have invented a new and useful Improvement in Excavating-Machines; and I do hereby declare that the following is a full and exact description thereof, reference being had to the accompanying drawings and to the letters of reference marked thereon.

My invention relates to excavating machines which elevate the earth by a bucket-wheel into which the earth is plowed and is then carried off by an endless apron.

My invention consists in a spring mold board and spring plate to prevent choking the machine and in a peculiar arrangement of the plow second wheel.

Figure 1:
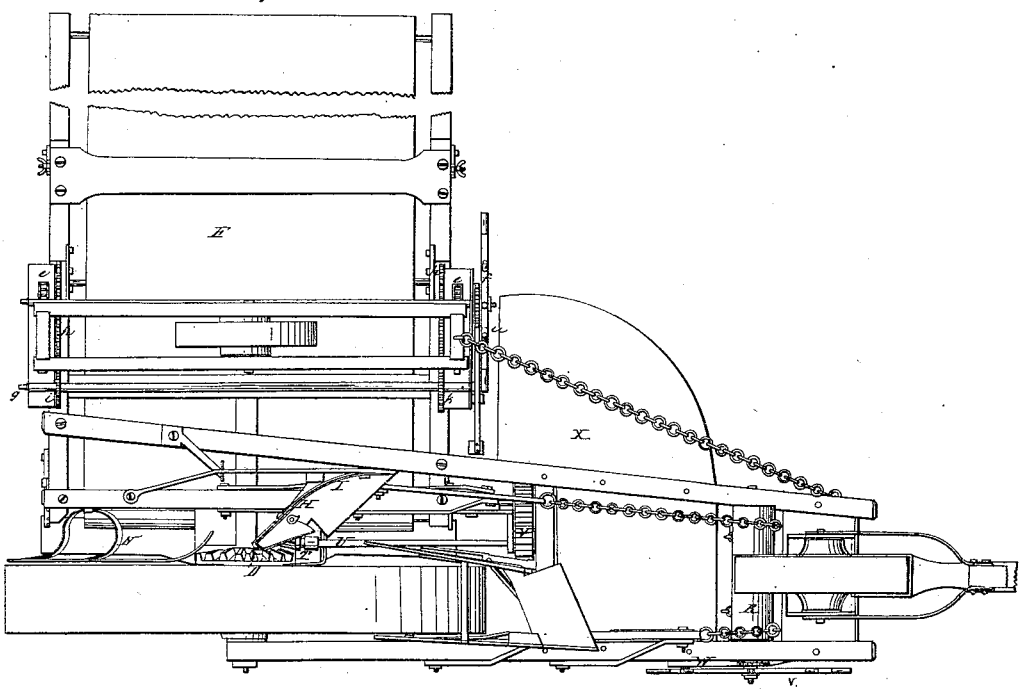
Figure 2:
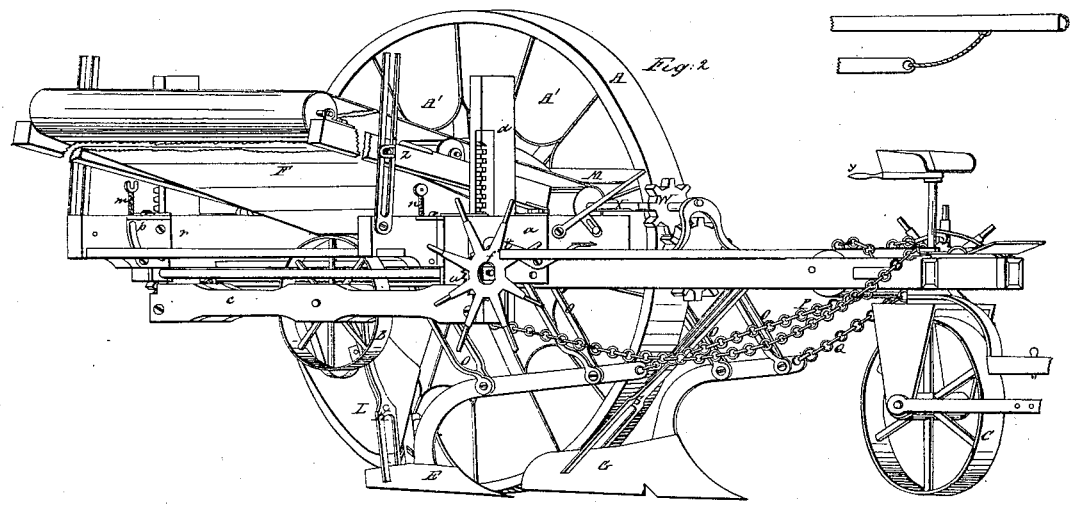

In the accompanying drawings: Figure 1, is a bottom view of my machine a part of the apron being cut away to reduce the size of the drawing, Fig. 2, is a perspective view of my machine.

This machine is mainly supported by the principal or bucket wheel A, the apron resting somewhat on the second wheel and the front part of the frame upon the guide wheel C.

The main wheel A is provided with buckets A′, into which the earth is carried by the plow E. Then as the wheel rolls forward the earth is carried upward and deposited upon the endless apron F. The plow G travels in advance of wheel A, opening a deep furrow as a path for the wheel and turning the earth to the right, while the plow E turns the same earth and its own furrow to the left, filling the buckets A′ in succession. This plow E is prevented from moving to the right by the guide K, which holds the plow close to the wheel A, in order to pack the earth into the buckets A′.

To prevent clogging the machine by catching a stone or other substance between this plow and the wheel, the mold board is made flexible by means of a hinge H, and a spring I. This spring is stiff enough to resist the ordinary action of the furrow, but will yield to the pressure of a stone and thus prevent breaking the machine.

The plate L is designed to prevent the earth from falling out of the buckets A′ until these latter rise above the apron F and directing board M. This plate is held by a spring N, which allows a stone to pass the plate without breaking or choking the machine. In practical operation, this spring plate like the spring mold board, greatly facilitates the operation of the machine.

Both of the plows are arranged in a very peculiar manner. They are supported or attached to the frame by means of swinging braces O, so as to be elevated or depressed at pleasure by chains P and Q, attached to the beams and pasisng around the windlass R.

The lateral movement of the plows is prevented by the guides K and S, the plows being mainly drawn by the chains P and Q. By this simple arrangement the plows have all the flexibility and adjustability necessary and yet they are held securely in working position.

The roller R is operated by the capstan wheel $v$, and this wheel is fixed by a pawl $w$.

The endless apron F is designed to carry off the earth which is elevated by the bucket wheel A, and its length may be varied according to circumstances. It receives motion from the main wheel A, upon the hub of which is a bevel cog wheel D, Fig. 1, engaging with another bevel wheel T, thus transmitting motion to the shaft U, and cog wheel V. This wheel V, gives motion to cog wheel W, Fig. 2, upon the shaft X of roller Y, which carries the endless apron F. The apron is hinged to the main frame and may be adjusted to any height, being fixed by thumb screws Z, Fig. 2.

In case the earth is to be deposited in a cart instead of being carried off upon the long apron, then the above described apron is removed and some of the rollers placed in screw eyes $m$, $n$, when a short apron is placed upon these rollers. This short apron may be adjusted by the arms $o$, which are hinged to the frame $r$, and provided with guides $p$, and set screws $q$, for such adjustment. With this arrangement the cart may be placed under the arms $o$, and drawn along to accompany the excavating machine, so that the short apron will deposit the earth in the cart.

The wheel B and its frame are made adjustable both laterally and vertically for convenience, in supporting the endless apron and in ditching. In Fig. 2, it is seen that the axle of wheel B rests in bar $c$, which in turn are connected with the upright pieces $d$. These uprights have ratchet bars, engaging with pinions $e$, Fig. 1, upon the same shaft with the windlass wheel $f$. By turning this windlass wheel, the frame $c$, $d$, and the wheel B are elevated or depressed at pleasure.

In ditching the first furrow is cut in the usual manner. Then the wheel B, is elevated so as to bring the machine in proper position for cutting the second furrow. Then the wheel B is again raised for cutting the third furrow; and so on until the ditch is of the full depth.

On the under sides of the slides are two other ratchet bars $h$, Fig. 1, into which the two pinions $i$, $k$, work. By means of crank $g$, these pinions are made to operate the slides $a$, and thus move the slides $a$ and wheel B, to the right or to the left at pleasure. During this lateral movement of the wheel B the frame may be temporarily supported by a prop to prevent said wheel from dragging too heavily upon the ground. When the wheel B, is brought to the desired position, it is secured in place by the pawl $t$, locking into the ratchet wheel $w$.

In ditching, it is often difficult to keep the team upon the exact line desired. Therefore I have arranged the caster wheel C, for guiding the machine. A man stands upon the platform $x$, and by placing his hand upon the lever $y$, (attached to the driver's seat), he can turn the caster wheel C to the right or to the left and thus guide the machine. The shaft $z'$ of the caster wheel is loosely tied to the main team shaft so as to check the action of the caster wheel.

Having thus fully described my invention, what I claim and desire to secure by Letters Patent of the United States is:

1. The spring mold-board, for the purpose of allowing stones and other substances to pass between the plough and the bucket-wheel, thus preventing choking the machine, substantially as set forth.

2. The spring plate in combination with the wheel A, substantially as set forth.

3. The use of the wheel B, the same being adjustable both vertically and laterally; the whole being arranged and operated substantially as set forth.

4. The forked guides K and S in combination with the hinged mold-board, substantially as set forth.

GILBERT S. MANNING.

Witnesses:
DANIEL BREED,
EDW. F. BROWN.